United States Patent [19]
Elspass et al.

[11] Patent Number: 5,883,173
[45] Date of Patent: Mar. 16, 1999

[54] NANOCOMPOSITE MATERIALS (LAW392)

[75] Inventors: Chester W. Elspass, Alpha; Dennis G. Peiffer, Annandale; Edward Nathan Kresge, Watchung, all of N.J.; Dong-Tsai Hsieh, Arcadia, Calif.; James Joseph Chludzinski, Whitehouse Station; Keng S. Liang, Bridgewater, both of N.J.

[73] Assignee: Exxon Research and Engineering Company, Florham Park, N.J.

[21] Appl. No.: 771,179

[22] Filed: Dec. 20, 1996

Related U.S. Application Data

[63] Continuation-in-part of Ser. No. 494,208, Jun. 23, 1995, abandoned.

[51] Int. Cl.$^6$ .................................................... G08K 3/34
[52] U.S. Cl. .................. 524/446; 524/445; 524/447; 524/449; 524/534; 524/789; 524/791; 524/856
[58] Field of Search ................................. 524/445, 446, 524/447, 449, 534, 789, 791, 856

[56] References Cited

U.S. PATENT DOCUMENTS

| | | | |
|---|---|---|---|
| 4,472,538 | 9/1984 | Kamigaito et al. | 523/202 |
| 4,810,734 | 3/1989 | Kawasumi et al. | 523/216 |
| 4,889,885 | 12/1989 | Usuki et al. | 524/445 |
| 5,248,720 | 9/1993 | Deguchi et al. | 524/444 |

FOREIGN PATENT DOCUMENTS

| | | |
|---|---|---|
| WO9304118 | 3/1993 | WIPO . |
| WO931119 | 6/1993 | WIPO . |

OTHER PUBLICATIONS

Y. Kojima, et al.; Mechanical Properties of Nylon 6–Clay Hybrid; & pp. 1185–1189; May 1993; J. Mat. Res, vol. 8, No. 5.

K. Yano, et. al.; Synthesis and Properties of Polimide–Clay Hybrid; 1993, J. Poly. Sci., Feb. 9, 1993; pp. 2493–2498.

A. Usuki, et.a l.; Swelling Behavior of Montmorillonite Cation Exchanged for W–Amino Acids É–caprolactam.; May 1993; J. Mat. Res. vol. 8, No. 5, pp. 1174–1178.

*Primary Examiner*—Marion McCamish
*Assistant Examiner*—John J. Guarriello
*Attorney, Agent, or Firm*—Gerard J. Hughes

[57] ABSTRACT

The present invention relates to a latex comprising water and a layered material intercalated with a polymer. The invention also relates to a nanocomposite material comprising a layered material intercalated with a polymer. The latex can be produced by forming a dispersion of layered material in water, adding surfactant, polymerizable monomer or monomers, and a polymerization initiator to the mixture and then polymerizing the monomer to form a latex. The latex can also be formed from preformed polymers. Composite materials formed from latexes produced by either method have improved mechanical properties and reduced air permeability.

7 Claims, No Drawings

NANOCOMPOSITE MATERIALS (LAW392)

CROSS REFERENCE TO RELATED APPLICATIONS

This application is a Continuation-in-Part of application Ser. No. 494,208 Filed Jun. 23, 1995; now abandoned.

FIELD OF THE INVENTION

This invention relates to composite materials having reduced permeability to small molecules, such as air, and which have enhanced mechanical properties. More particularly this invention relates to layered silicates intercalated with a polymer.

BACKGROUND OF THE INVENTION

Layered clay minerals such as montmorillonite are composed of silicate layers with a thickness of about 1 nanometer. Dispersions of such layered materials in polymers are frequently referred to as nanocomposites.

Recently, there has been considerable interest in forming nanocomposites as a means to improve the mechanical properties of polymers. Incorporating clay minerals in a polymer matrix, however, does not always result in markedly improved mechanical properties of the polymer. This may be due to the lack of affinity between the layered silicate materials and the organic polymers. Thus it has been proposed to use ionic interactions as a means of incorporating clay minerals in a polymer. In this regard, see for example U.S. Pat. No. 4,889,885 and U.S. Pat. No. 4,810,734. This type of approach, unfortunately, has limited usefulness. Indeed, a more direct, simple, and economic approach to preparing nanocomposites is highly desirable.

One object of the present invention is to provide a latex comprising a layered silicate intercalated with a polymer.

Another object of the present invention is to provide a composite material formed from a latex of a layered silicate and a polymer which material has reduced permeability to small molecules such as air, and improved mechanical properties.

These and other objects, features and advantages of the present invention will become more apparent from the description which follows.

SUMMARY OF THE INVENTION

In one embodiment of the present invention, a latex is provided comprising water and a layered material, such as a layered mineral, intercalated with a polymer.

Another embodiment of the present invention provides a nanocomposite comprising a layered material intercalated with a polymer.

Another aspect of the present invention comprises a blend of a nanocomposite composed of a layered material intercalated with a polymer, and a second polymer.

One process for producing the latex of the present invention comprises forming a dispersion of a layered material in water including a surfactant such as an onium salt; adding a polymerizable monomer or monomers, such as an olefin or diene, and a polymerization initiator to the dispersion; and thereafter polymerizing the monomer or monomers to form the latex. The preparation of this latex comprises yet another embodiment of the present invention. This process is advantageous where polymerization can proceed in the presence of water.

Some technologically important polymers, for example butyl rubber and polyolefins, cannot be formed from monomers in the presence of polar liquids like water. In order to form these polymers, a second process for producing the latex of the present invention must be used whereby the latex is formed from bulk polymer. These polymers are referred to as pre-formed polymers because the polymerization from the monomer occurs in a separate procedure before the formation of the latex. In this process a surfactant is added to a mixture of polymer and non-polar liquid thereby forming an emulsion or micro-emulsion. Polar liquids have molecules with an electric dipole moment. A layered material is added to an emulsion or micro-emulsion and then subjected to shearing forces sufficient to form a latex containing a nanocomposite.

A composite material formed from the latex of the present invention prepared by either method has improved mechanical properties and reduced permeability to small molecules such as air. These materials are therefore particularly useful in a range of applications, particularly as a tire inner liner and as inner tubes, barriers, films, coatings and the like.

DETAILED DESCRIPTION

The methods below describe the formation of a solid nanocomposite intercalated with a polymer. A solid nanocomposite is a solid material containing molecules selected from the group consisting of anionic, cationic, and nonionic surfactants having a hydrophilic head group and at least one oleophilic tail wherein the tails are selected from the group of alkyl, alkenyl, and alkynyl groups having about 4 to about 30 carbon atoms, and layered material intercalated with a polymer, the layered material having an average number of layers between about 150 and about 300 layers, and an average interlayer separation in the range of about 20 to about 40 Å. The layered material intercalated with a polymer is in the form of nano-scale particles dispersed throughout the solid nanocomposite material. Often the nano-scale particles are called nanocomposite particles. Each individual nanocomposite particle has at least 10 layers.

The solid nanocomposite material is formed from a latex. A latex is a two phase material that has a continuous liquid phase such as water and a second phase comprising micelles of 0.5 microns in average size or larger dispersed in the continuous phase. The latex is prepared by one of two methods, depending on the type of polymer to be intercalated in the layered material.

In-situ polymerization in a mixture of surfactant, layered material, monomer, and a liquid is used in cases where the polymerization can occur in the presence of a polar liquid. In this method polymers can be formed by either emulsion or micro-emulsion polymerization methods. This process results in a latex containing a layered material intercalated with a polymer.

In another method, a mixture of pre-formed polymer, surfactant, and a polar liquid is processed to form an emulsion or micro-emulsion. Layered material is then added and shearing forces are applied to the mixture to produce a latex containing a layered material intercalated with a polymer.

The following is a detailed description of the formation of a solid nanocomposite material intercalated with a polymer prepared in-situ.

Any natural or synthetic layered mineral capable of being intercalated may be employed; however, layered silicate minerals are preferred. The layered silicate minerals that may be employed in the present invention include natural and artificial minerals capable of forming intercalation compounds. Non limiting examples of such minerals include smectite clay, montmorillonite, saponite, beidellite, montronite, hectorite, stevensite, vermiculite, kaolinite and hallosite. Of these montmorillonite is preferred.

The surfactant used is any compound capable of derivatizing the layered mineral. Representative surfactants include anionic, cationic, and nonionic surfactants having a hydrophilic head group and at least one oleophilic tail wherein the tails are selected from the group of hydrogen, alkyl, alkenyl, and alkynyl groups having about 4 to about 30 carbon atoms. Representative surfactants include quaternary ammonium, phosphonium, maleate, succinate, molecules having carboxyl containing groups, acrylate, benzylic hydrogens, benzylic halogens, aliphatic halogens, and oxazoline.

It will be readily appreciated that some of the above mentioned surfactants are also emulsifying agents. However, in those instances when the surfactant is not an emulsifying agent preferably an emulsifying agent will be employed in carrying out the polymerization. Optionally, of course, another emulsifying agent may be used even when the surfactant has emulsifying properties. In either event, the emulsifying agent will be one typically used in emulsion or microemulsion polymerization processes.

The polymers and copolymers referred to herein as emulsion polymers are those formed by emulsion polymerization techniques, and those referred to herein as microemulsion polymers are those formed by microemulsion techniques. In both techniques micelles containing monomer and surfactant are present in a solvent, and the polymerization occurs within the micelles resulting in the formation of latex particles. In microemulsion polymerization the latex particles range in average size from about 50 Å to about 0.2 microns. In emulsion polymerization, on the other hand, the latex particles range in average size from about 0.2 to about 100 microns. While the average latex particle size of microemulsions and emulsions fall into distinct ranges, the actual sizes of the latex particles present in either case vary over a wide range of sizes. There is sufficient overlap in actual particle size that even in the case on an emulsion some latex particles smaller than 100 Å in size are present. While not wishing to be bound by any theory, it is believed that polymerization occurs in the presence of a layered material when latex particles that have a size less than or equal to the average separation distance of the layers are present in the liquid. This separation depends on the relative concentrations of the layered material and surfactant in the solvent, as well as on other factors such as the type of layered material employed. Polymerization can occur by either microemulsion or emulsion polymerization methods because there is an overlap in latex particle size range between the emulsions and microemulsions on the order of the interlayer distances employed in this invention.

Some polymers useful in the practice of this invention are polymers based on one or more water immiscible, free radical polymerizable, monomers such as olefinic monomers and especially styrene, paramethyl styrene, butadiene, isoprene, and acrylonitrile. Particularly preferred are styrene rubber copolymers and styrene acrylonitrile rubber copolymers, i.e., copolymers having styrene, butadiene, isoprene and acrylonitrile. Especially preferred, in the practice of the present invention are homopolymers and copolymers having a glass transition temperature less than about 25° C., a number average molecular weight above about 5,000 g/mole and especially about 15,000g/mole. Also, the preferred polymer will contain some unsaturation or other reactive sites for vulcanization.

These methods are especially useful for forming nanocomposite materials having polymers with a Tg below about 100° C. Particularly preferred polymers have Tg in the range of about −50° C. to about 100° C.

The latex of an intercalatable mineral having an emulsion or microemulsion polymer intercalated in the mineral is prepared by forming a dispersion of the layered mineral in a polar liquid such as water and including a surfactant. Typically, the mineral is first dispersed in water by adding from about 0.01 to about 80 grams of mineral to 100 grams of water and preferably, about 0.1 to about 10.0 g of mineral to 100 g of water, and then vigorously mixing or shearing the mineral and water for a time sufficient to disperse the mineral in the water. Then a surfactant such as a hydrocarbyl onium salt is added to the dispersion, preferably as a water solution, and with stirring.

The amount of surfactant used in the process of the present invention depends on the type of layered material and monomers used as well as process conditions. In general, however, the amount of surfactant used will be in the range from about 100% to about 2,000% of the cationic exchange capacity (C.E.C) of the layered mineral. Generally, an amount of surfactant in the range of about 1000% to about 2,000% C.E.C. is used when the formation of a microemulsion is desired.

Next, the polymer latex is formed by adding to the mineral dispersion an emulsifying agent, if desired or necessary, the appropriate monomer or monomers, and a free radical initiator under emulsion polymerization or microemulsion conditions. For example, styrene and isoprene are polymerized in the mineral dispersion using a free radical polymerization initiator while stirring the reactants. The copolymerization typically is conducted at a temperature in the range of about 25° C. to about 100° C. and for a time sufficient to form the polymer latex, followed by termination of the reaction.

In cases where polymerization cannot occur in the presence of the liquid present in the emulsion or microemulsion, the latex is formed by a process that uses pre-formed polymers. Pre-formed polymers are polymers that are formed prior to the formation of the latex. The layered materials, surfactants, and liquids described above for production of the in-situ polymer latex are all suitable for the production of a pre- formed polymer latex.

Pre-formed polymers are based on one or more of the monomers selected from the group consisting of styrene, paramethyl styrene, butadiene, isoprene, chloroprene, ethylene, propylene, vinyl chloride, vinyl acetate, nitriles such as acrylonitrile, butene, hexene, heptene, isobutylene, octene, maleic anhydride, succinic anhydride, dienes, and acrylates, and having molecular weights that range from about 1,000 gram per mole to about $10^7$ gram per mole. Often it is desirable that the polymer be functionalized. Preferably the polymer contains from about 0.01 to about 900 milliequivalents of functionalization per 100 grams of polymer, and more preferably from about 0.01 to about 200 milliequivalents of functionalization per 100 grams of polymer. Representative functionalization groups are quaternary ammonium, phosphonium, maleate, succinate, molecules having carboxyl containing groups, acrylate, benzylic hydrogens, benzylic halogens, aliphatic halogens, and oxazoline.

To form the latex containing a nanocomposite material intercalated with a polymer, the pre-formed polymer is mixed with a surfactant, a polar liquid, and, optionally, a co-solvent. Typical liquids are water or dimethylformamide. Typical co-solvents are aliphatic alcohols, aliphatic alkanes, esters, and ethers. Preferred concentration ranges are about 0.1% to about 70 wt% surfactant, and 0.1% to about 63 wt % polymer, with the balance being solvent, or solvent and optional co-solvent. The wt % is based on the total weight of polymer, surfactant, liquids, and optional co-solvent when present. After mixing is complete layered material is added to the solution. Layered material concentration in the solution ranges from about 0.2% to about 4 wt %, based on the total weight of polymer, surfactant, liquid, optional co-solvent when present, and layered material. Shearing forces are then applied to the mixture, preferably resulting from ultrasonic vibration and high speed blenders, for a time sufficient to form the latex.

The latex produced by either method described above can be used to form a solid nanocomposite where the layered material ranges from about 0.1 wt % to 90 wt. % of the total weight. These nanocomposites can be formulated into coatings or films following standard techniques employed for forming such materials. Additionally, the nanocomposite of the layered silicate mineral and the polymer may be recovered by coagulating the latex, and drying the solid composite. The solid nanocomposite can then be formed into tire inner-liners or inner tubes using conventional processing techniques such as calendaring or extrusion followed by building the tire and molding.

In one embodiment of the present invention the nanocomposite is dispersed with a second polymer, such as a styrene-rubber copolymer by blending on a rubber mill or in an internal mixer. Preferably the nanocomposite will be blended with a polymer formed from the same monomer or monomers used in forming the nanocomposite. The amount of nanocomposite in the blend typically will be in the range of about 0.1 to about 99.9 wt %, based on the total weight of the blend.

In producing tire inner liners the polymer blended with the nanocomposite of this invention preferably will have a molecular weight of greater than about 10,000 and some unsaturation or other reactive sites so that it can be vulcanized or cross-linked in the bulk state.

The invention will be more clearly understood by reference to the following examples.

Example 1

Samples of 0.2, 0.8, 1.1, 1.2, 4, and 8 wt % montmorillonite in water were prepared. The results of small angle X-ray scattering measurements are shown in Table 1. Results of the measurements of the 0.2 through 1.2 wt % samples are characteristic of slightly deformed silicate layers completely dispersed in the water. The absence of any (001) Bragg reflections indicates that at these concentrations the solution is a suspension of individual silicate layers 9.6 Å thick isotropically oriented with respect to each other, and therefore having no average layer repeat distance. The results of the 4 wt % and 8 wt % samples are characteristic of a disordered aggregation of silicate layers with an average layer repeat distance of about 80 Å. Dodecyl trimethyl ammonium bromide surfactant was added to all but the 1.1 wt % sample in an amount equal to 100% of the cation exchange capacity of the montmorillonite in each sample. All those cases exhibit an average layer repeat distance of about 20 Å. See Table 1.

The surfactant was then added to the 1.1 wt % sample above to make a solution of 1.1 wt % clay and 3.5 wt % surfactant in water. This amount of surfactant corresponds to 1140% cation exchange capacity. X- ray scattering measurements of this sample revealed (001) Bragg reflections corresponding to an average layer repeat distance of about 30 Å. See Table 1.

Table 1 shows that at high clay concentrations the addition of surfactant causes a contraction of the interlayer separation. At lower clay concentrations, below about 4 wt %, the addition of surfactant in an amount equal to about 100% of the cation exchange capacity of the layered material initially causes the aggregation of the silicate layers into a layered structure having a measurable interlayer separation. Expansion of the interlayer separator is observed for surfactant concentration of approximately 1140% of the cation exchange capacity of the clay.

Example 2

A layered silicate, montmorillonite clay (18 g), was slurried with water (450 g) which had been degassed by sparging with nitrogen. The slurry was stirred overnight at 23° C. The clay was dispersed in the water in a Waring blender for three minutes and then degassed further. Dodecyl trimethyl ammonium bromide surfactant (25.7 g) was dissolved in degassed water (250 g) and added to the clay slurry. Isoprene (35 g), styrene (15 g), and azobisisobutyronitrile (AIBN) (0.25 g) as initiator were blended and then added to the clay slurry. The mixture was mechanically stirred for 20 hours at 23° C. and for 26 hours at 65° C. at which time polymerization was terminated with a 5 g aliquot of a mixture of(0.24 g) 2,6-di-tert-butyl-4-methylphenol, (1.6 g) hydro-quinone, (0.8 g) tetrakis [methylene(3,5-di-tert-butyl-4-hydroxyhydrocinnamate)] methane and 200 ml methanol. The net result was the formation of an emulsion containing a layered silicate having a styrene-isoprene copolymer latex intercalated in the layered mineral. While not wishing to be bound by any theory, it is believed that the surfactant at this concentration causes the layers to aggregate parallel to each other. Polymeric intercalation would not be possible if the layers were not oriented parallel to each other, instead an isotropic mixture of polymer and individual silicate layers would result.

Example 3

A solid nanocomposite was formed from the latex of Example 2 by adding an excess of methanol to the latex, separating the solid from the liquid aqueous phase and washing the solid six times with methanol, followed by drying for about 18 hours at 60° C. under vacuum and for 48 hours at 23° C. in vacuum. Information obtained from electron micrographs of this sample are summarized in Table 3. That table shows that the number of silicate layers in each nanocomposite particle is at least 10, with an average number of layers of about 260. Additionally, the interlayer separation was measured to be about 36 Å. The micrographs also showed that the maximum number of layers in each nanocomposite particle is about 1000.

Example 4

A portion of the solid nanocomposite (20 grams) of Example 3 was then melt blended at 130° C. in a Brabender mixer for 5 minutes with a styrene-isoprene copolymer (20 grams) that was synthesized identically but had no clay. The blend of nanocomposite and the clay-free styrene-isoprene copolymer was cross-linked by roll milling the blend with stearic acid (1 phr), zinc oxide (3.9 phr), and tetramethyl thiuram disulfide (accelerator)) (1 phr) at 55° C. for ten minutes. Then the blend was hot pressed into 20 mil films for 20 minutes at 130° C. The films were tested on a Mocon 2/20 for oxygen transmission at 30° C. The results are given in Table 3 below. Also shown in Table 3 were the results obtained with a film formed from a styrene-isoprene copolymer that had been synthesized identically but had no clay. (Comparative Example 1)

Uniaxial tensile properties were also measured on mini-tensile film specimens using an Instron tester. The stress-strain measurements were performed at room temperature and at an extension rate of 0.51 mm/min and the results are shown in Table 4 below. Also shown in Table 4 and labeled as Comparative Example 1 are the tensile properties obtained for a polystrene-isoprene copolymer that was synthesized identically to that in Examples 2,3, and 4 but had no clay.

Example 5

Triethylammonium functionalized paramethyl styrene -co-isobutylene-co-isoprene, bromine neutralized ionomer, 5.6 g was dissolved in 100 g tetrahydrofuran overnight. 300g of water, 1 g poly(oxy 1,2-ethanediel, a-sulfo-w-nonyl phenoxy sodium) surfactant ( Witco D-51-51), and 1 g hexadecanol were added to the polymer solution and stirred at 23° C. overnight, then at 65° C. for 2 hours. Subsequently, 2 g sodium montmorillonite was added and stirred at 65° C. for 2 hours. Ultrasonic vibration was then applied to the mixture at 65° C. using a W-225R Ultrasonic Inc. sonicator for 4 minutes at 50% duty cycle. The resultant was filtered then dried at 60° C. for 12 hours in vacuum, and 48 hours at 23° C. in vacuum.

Example 6

A solid nanocomposite was formed from the resultant of Example 5 by heating at 60° C. under vacuum for 12 hours and continued vacuum at 23° C. for 48 hours. This material was melt compression molded at 200° C. for 4 minutes thereby producing 20 mil films. Films were tested on a Mocon 2/20 for oxygen transmission at 30° C. The results are shown in table 3. Uniaxial tensile properties were also measured on 1 mini-tensile specimens I inch long and 20 mil thick. Tests were conducted using an Instron Tester with a cross head speed of 20 inches per minute. Results of these tests are shown in table 4. Information obtained from electron micrographs of this sample are summarized in table 2. The average number of silicate layers in each particle of layered material range from about 10 to about 1000, with an average number of layers of about 160. Additionally, the interlayer separation was measured to be about 25 Å.

Also shown in Tables 3 and 4 are results obtained with a film made according to the method of Example 5 and 6 but without clay (Comparative Example 2).

TABLE 1

| Wt. % Clay | 0.2% | 0.8% | 1.1% | 1.2% | 4% | 8% |
|---|---|---|---|---|---|---|
| Layer repeat distance without surfactant | N/A | N/A | N/A | N/A | 80Å | 80Å |
| Layer repeat distance with surfactant concentration of 100% cation exchange capacity (C.E.C.) | 20Å | 20Å | — | 20Å | 20Å | 20Å |
| Layer repeat distance with surfactant concentration of 1140% C.E.C. | — | — | 30Å | — | — | — |

TABLE 2

| Polymerization Method | Amount of layered material having more than 10 and less than 1,000 layers. (Vol.%) | Average number of layers | Average interlayer separation |
|---|---|---|---|
| In-situ | 99.996% | 230 | 36Å |
| Pre-formed | 99.998% | 161 | 25Å |

TABLE 3

| Film | Wt % Clay | Oxygen Transmission | $\frac{cm^3 \times MILS^*}{m^2 \times 24\ hr.}$ |
|---|---|---|---|
| Example 4 | 15.3 | | 4,138 |
| Comparative Example 1 | 0 | | 12,340 |
| Example 6 | 26.3 | | 2,610 |
| Comparative Example 2 | 0 | | 6520 |

TABLE 4

| Film | Stress @ Break (psi) | Strain @ Break (%) | 100% Modulus (psi) | Energy Break (in-lbs.) |
|---|---|---|---|---|
| Comparative Example 1 | 2,001 | 560 | 503 | 12.1 |
| Example 4 | 2,312 | 497 | 699 | 11.3 |
| Example (6) | 1,421 | 267 | 835 | 2.53 |
| Comparative Example 2 | 298 | 1,322 | 53 | 1.60 |

What is claimed is:

1. A latex comprising:
   at least one liquid selected from the group consisting of water, dimethyl formamide, aliphatic alcohols, aliphatic alkanes, esters, and ethers;
   about 0.1 wt.% to about 70 wt.% of a surfactant selected from the group consisting of quaternary ammonium, phosphonium, maleate, succinate, surfactants having carboxyl containing groups, acrylate, benzylic hydrogens, benzylic halogens, aliphatic halogens, and oxazoline;
   and about 0.2 wt.% to about 4 wt.%. based on the total weight of the latex, of a layered material having an interlayed seperation and selected from the group consisting of smectite clay, montmorillonite, saponite, beidellite, montionite, hectorite, stevensite, vermiculite, and hallosite;
   the layered material being intercalated with about 0.1 wt.% to about 63 wt.% of a functionalized preformed polymer formed from at least one monomer selected from the group consisting of styrene, paramethyl styrene, butadiene, isoprene, chloroprene, ethylene, propylene, vinyl chloride, vinyl acetate, nitrites such as acrylonitrile, butene, hexene, heptane, isobutylene, octene, maleic anhydride, succinic anhydride, dienes, and acrylates, thereby expanding the interlaying separation of the layered material;
   the polymer having functional groups in an amount ranging from about 0.01 to about 900 mili-eguivalents per 100 grams of polymer and selected from the group consisting of quaternary ammonium, phosphonium, maleate, succinate, carboxyl containing groups, acrylate, benzylic hydrogens, benzylic halogens, aliphatic halogens, and oxazoline.

2. The latex of claim 1 wherein the polymer is a styrene-containing copolymer.

3. The latex of claim 2, wherein the copolymer contains a co-monomer slected from the group consisting of butadiene, isoprene, chloroprene and acrylonitrile.

4. The latex of claim 1 wherein the polymer is formed from a free radical polymerizable olefinic monomer or monomers.

5. The latex of claim 1 wherein the wherein the layered material is montmorillonite.

6. The latex of claim 1 wherein the layered material ranges from about 0.2% to about 4% of the total weight of the latex.

7. A latex comprising:

at least one liquid selected from the group consisting of water, dimethyl formamide, aliphatic alcohols, aliphatic alkanes, esters, and ethers;

a surfactant selected from the group consisting of quaternary ammonium, phosphonium, maleate, succinate, surfactants having carboxyl containing groups, acrylate, benzylic hydrogens, benzylic halogens, aliphatic halogens, and oxazoline;

and about 0.2 wt.% to about 4 wt.%, based on the total weight of the latex, of a layered material having an interlayer separation and having a cationic exchange capacity and selected from the group consisting of smectite clay, montmorillonite, saponite, beidellite, montronite, hectorite, stevensite, veimiculite, and hallosite;

the surfactant being present in an amount ranging from about 100% to about 2.000% of the layered material's cationic exchange capacity, and the layered material being intercalated with about 0.1 wt.% to about 63 wt.% of a polymer formed by in-situ emulsion or microemulsion polymerization of monomers selected from the group consisting of styrene, para-methylstyrene, butadiene, isoprene, chloroprene and acrylonitrile, thereby expanding the interlayer separation of the layered material.

* * * * *